(12) United States Patent
Fujioka

(10) Patent No.: US 10,308,078 B2
(45) Date of Patent: Jun. 4, 2019

(54) PNEUMATIC TIRE

(71) Applicant: TOYO TIRE & RUBBER CO., LTD., Osaka-shi, Osaka (JP)

(72) Inventor: Tsuyoshi Fujioka, Osaka (JP)

(73) Assignee: TOYO TIRE CORPORATION, Itami-shi (JP)

(*) Notice: Subject to any disclaimer, the term of this patent is extended or adjusted under 35 U.S.C. 154(b) by 199 days.

(21) Appl. No.: 15/248,561

(22) Filed: Aug. 26, 2016

(65) Prior Publication Data
US 2017/0066290 A1   Mar. 9, 2017

(30) Foreign Application Priority Data

Sep. 8, 2015 (JP) ................... 2015-176732
Sep. 8, 2015 (JP) ................... 2015-176754

(51) Int. Cl.
*B60C 11/12* (2006.01)
*B60C 11/11* (2006.01)

(52) U.S. Cl.
CPC ...... *B60C 11/1218* (2013.01); *B60C 11/1259* (2013.01); *B60C 11/1272* (2013.01); *B60C 11/11* (2013.01); *B60C 2011/1213* (2013.01)

(58) Field of Classification Search
CPC .................................................. B60C 11/1218
See application file for complete search history.

(56) References Cited

U.S. PATENT DOCUMENTS

2006/0016533 A1*  1/2006  Ohashi ................. B60C 11/12
                                                    152/151

2012/0037288 A1    2/2012  Sakamai
2012/0180920 A1    7/2012  Nagayasu

FOREIGN PATENT DOCUMENTS

| CN | 102602251 A |   | 7/2012 |
|----|-------------|---|--------|
| EP | 2465708 A1  | * | 6/2012 |
| JP | 2002-103921 A | * | 4/2002 |
| JP | 2002-321509 A | * | 11/2002 |
| JP | 2002-321509 A |   | 11/2002 |
| JP | 2004-314758 A |   | 11/2004 |
| JP | 2005-104188 A |   | 4/2005 |
| JP | 2006-27558 A  |   | 2/2006 |

(Continued)

OTHER PUBLICATIONS

Machine translation for Europe 2,465,708 (Year: 2018).*

(Continued)

*Primary Examiner* — Steven D Maki
(74) *Attorney, Agent, or Firm* — Westerman, Hattori, Daniels & Adrian, LLP

(57) ABSTRACT

A pneumatic tire has a sipe formed in a land portion of a tread surface. The sipe has a 2D center portion, a 3D center portion and 3D side portion. The 2D center portion is positioned in a sipe bottom side at a center in a length direction. The 3D center portion is positioned in a top surface side at the center in the length direction. The 3D side portion is positioned in one end or both ends in the length direction. The 3D center portion and the 3D side portion are open at the top surface. A three-dimensional shape of the 3D center portion has a structure in which wall surfaces are engageable with each other in the length direction. A three-dimensional shape of the 3D side portion has a structure in which wall surfaces are engageable with each other in the depth direction.

11 Claims, 7 Drawing Sheets

(56) References Cited

FOREIGN PATENT DOCUMENTS

| | | | |
|---|---|---|---|
| JP | 2006-298331 A | * | 11/2006 |
| JP | 2007-22361 A | | 2/2007 |
| JP | 2011-105131 A | * | 6/2011 |
| KR | 10-1040630 B1 | | 6/2011 |
| WO | 2006/001446 A1 | | 1/2006 |

OTHER PUBLICATIONS

Machine translation for Japan 2011-105131 (Year: 2017).*
Machine translation for Japan 2002-321509 (Year: 2012).*
Machine translation for Japan 2002-103921 (Year: 2012).*
Machine translation for Japan 2006-298331 (Year: 2017).*
Office Action dated Dec. 29, 2017, issued in counterpart Chinese Application No. 201610309812.3, with English translation (11 pages).
Office Action dated Jul. 27, 2017, issued in counterpart Chinese Application No. 201610309812.3, with English translation. (14 pages).

* cited by examiner

PNEUMATIC TIRE

BACKGROUND OF THE INVENTION

Field of the Invention

The present invention relates to a pneumatic tire in which a sipe is formed in a land portion of a tread surface, and is more particularly useful as a studless tire.

Description of the Related Art

Conventionally, a cut called as a sipe has been formed in a land portion such as a block and a rib, in the studless tire. Due to an edge effect and a water removing effect of the sipe, traveling on an ice road surface having a low coefficient of friction can be stabilized, whereby it is possible to enhance a so-called ice performance. A two-dimensional sipe formed into a two-dimensional shape which is not changed along a depth direction has been known as the sipe mentioned above, and a plane sipe and a wavy sipe are put to practical use.

Further, a three-dimensional sipe formed into a three-dimensional shape which is changed along a depth direction has been known, as described in Patent Documents 1 to 6. In the three-dimensional sipe, excessive deformation of the land portion is suppressed since wall surfaces of the sipe are engaged with each other at the braking time and the cornering time. As a result, it is possible to securely achieve the edge effect and the water removing effect. However, if the three-dimensional shape is uniformly formed, there is a case that only the deformation in a certain specific direction (for example, a back and forth direction) is suppressed. There has been a risk that wear resistance and irregular wear resistance are lowered since the deformation in the other direction (for example, a lateral direction) can not be sufficiently suppressed.

On the other hand, it has been found that there is room for improvement in the ice performance only by employing the three-dimensional shape which can suppress the deformation in a plurality of directions (for example, in the back and forth direction and the lateral direction). According to a study by the inventor of the present invention, deformability of the land portion is differentiated by positions of the sipe, and is differentiated by wear stages of the land portion. A specific sipe structure taking them into consideration has not been known.

PRIOR ART DOCUMENTS

Patent Documents

Patent Document 1: JP-A-2004-314758
Patent Document 2: JP-A-2006-27558
Patent Document 3: JP-A-2002-321509
Patent Document 4: JP-A-2005-104188
Patent Document 5: WO2006/001446
Patent Document 6: JP-A-2007-22361

SUMMARY OF THE INVENTION

The present invention has been made in view of the above actual circumstances, and an object of the present invention is to provide a pneumatic tire which can exhibit excellent wear resistance and irregular wear resistance while securing an ice performance.

The object can be achieved by the following present invention. The present invention provides a pneumatic tire comprising a sipe formed in a land portion of a tread surface, the sipe comprising a 2D center portion which is positioned in a sipe bottom side at a center in a length direction and is formed into a two-dimensional shape which is not changed along a depth direction; a 3D center portion which is positioned in a top surface side at the center in the length direction and is formed into a three-dimensional shape which is changed along the depth direction; and a 3D side portion which is positioned in one end or both ends in the length direction and are formed into a three-dimensional shape which is changed along the depth direction, wherein each of the 3D center portion and the 3D side portion is open at the top surface, and the three-dimensional shape of the 3D center portion has a structure in which wall surfaces are engageable with each other in the length direction, and the three-dimensional shape of the 3D side portion has a structure in which wall surfaces are engageable with each other in the depth direction.

In the land portion where the sipe like this is formed, the deformation in the length direction is suppressed mainly by the 3D center portion, and the deformation in the width direction is suppressed mainly by the 3D side portion. The top surface side of the sipe where the 3D center portion is positioned, and both ends of the sipe where the 3D side portion is positioned are both positions where the deformation of the land portion is comparatively great. Since the positions are formed into the three-dimensional shape, it is possible to effectively suppress the excessive deformation of the land portion. The 2D center portion is positioned in the sipe bottom side at the center in the length direction, which is the position where the deformation of the land portion is comparatively small.

In a stage from an early stage to a middle stage of the wear, the deformation becomes large since the rigidity of the land portion is comparatively low. However, according to the tire, the excessive deformation of the land portion can be suppressed by the 3D center portion and the 3D side portion as mentioned above. Further, in a stage after the middle stage of the wear, the deformation becomes small since the rigidity of the land portion is comparatively high. However, according to the tire, the rigidity of the land portion does not become too high since the 3D center portion is reduced or eliminated. As a result, the edge effect of the sipe can be satisfactorily achieved. Further, since the 3D side portion is positioned in one end or both ends of the sipe even after the middle stage of the wear, the rigidity of the land portion is not lowered too much.

The one end or both ends of the sipe may be open in a side surface of the land portion, and the 3D side portion may be positioned in the open sipe end. In this case, the sipe is formed as an one-side open sipe one end of which is opened in the side surface of the land portion, or a both-sides open sipe both ends of which are opened in the side surface of the land portion. The deformation of the land portion tends to become particularly larger in the periphery of the sipe end which is opened like this. Therefore, it is possible to effectively suppress the excessive deformation of the land portion since the 3D side portion is positioned in the open sipe end.

The three-dimensional shape of the 3D center portion may extend in the depth direction while being bent with a center convex portion which is formed into a convex shape in the length direction. According to the 3D center portion which is formed into the three-dimensional shape mentioned above, it is possible to satisfactorily suppress the excessive deformation of the land portion in the length direction.

The three-dimensional shape of the 3D center portion may be formed by providing projections and recesses engaging with each other on wall surfaces which are formed by a flat surface or a wavy surface. According to the 3D center portion which is formed into the three-dimensional shape mentioned above, it is possible to satisfactorily suppress the excessive deformation of the land portion in the length direction.

The three-dimensional shape of the 3D side portion may extend in the depth direction while being bent with a side convex portion which is formed into a convex shape in a width direction. According to the 3D side portion which is formed into the three-dimensional shape mentioned above, it is possible to satisfactorily suppress the excessive deformation of the land portion in the width direction.

The three-dimensional shape of the 3D center portion may extend in the depth direction while being bent with a center convex portion which is formed into a convex shape in the length direction, and the three-dimensional shape of the 3D side portion may extend in the depth direction while being bent with a side convex portion which is formed into a convex shape in a width direction, and ridge lines of the side convex portion extend in the length direction starting at the center convex portion. Since the ridge line of the side convex portion included in the three-dimensional shape of the 3D side portion extends in the length direction starting at the center convex portion which is included in the three-dimensional shape of the 3D center portion, the 3D center portion and the 3D side portion are smoothly connected, and it is possible to avoid a matter that the portion changes into an irregular shape. As a result, it is possible to prevent stress from being locally concentrated to the connection position between the 3D center portion and the 3D side portion, when the wall surfaces of the sipe engage with each other, and it is possible to prevent a crack and a defect from being generated within the sipe.

In the above structure, it is preferable that the ridge lines of two side convex portions which are adjacent in the depth direction extend in the length direction starting at the same center convex portion. As a result, the side convex portion is densely arranged, and it is possible to effectively suppress the deformation of the land portion in both ends of the sipe where the deformation of the land portion tends to be larger than in the center of the sipe. In a case that the sipe is open to the side surface of the land portion, the effect is more significantly achieved.

The three-dimensional shape of the 3D center portion may be formed into a sideways V-shaped form which is bent at one position in the depth direction. According to the 3D center portion which is formed into the three-dimensional shape mentioned above, it is possible to satisfactorily suppress the excessive deformation of the land portion in the length direction. Further, it is possible to reduce the resistance at the mold releasing time in the tire curing step, in comparison with the shape which is bent at a plurality of positions in the depth direction.

It is preferable that a distance from the top surface to a boundary between the 2D center portion and the 3D center portion is between 20% and 70% of a sipe depth. Further, it is preferable that a distance from a sipe end to a boundary between the 2D center portion and the 3D side portion is between 10% and 40% of a sipe length.

DETAILED DESCRIPTION OF THE PREFERRED EMBODIMENTS

An embodiment of the present invention will be explained with reference to the drawings.

Figure 1:
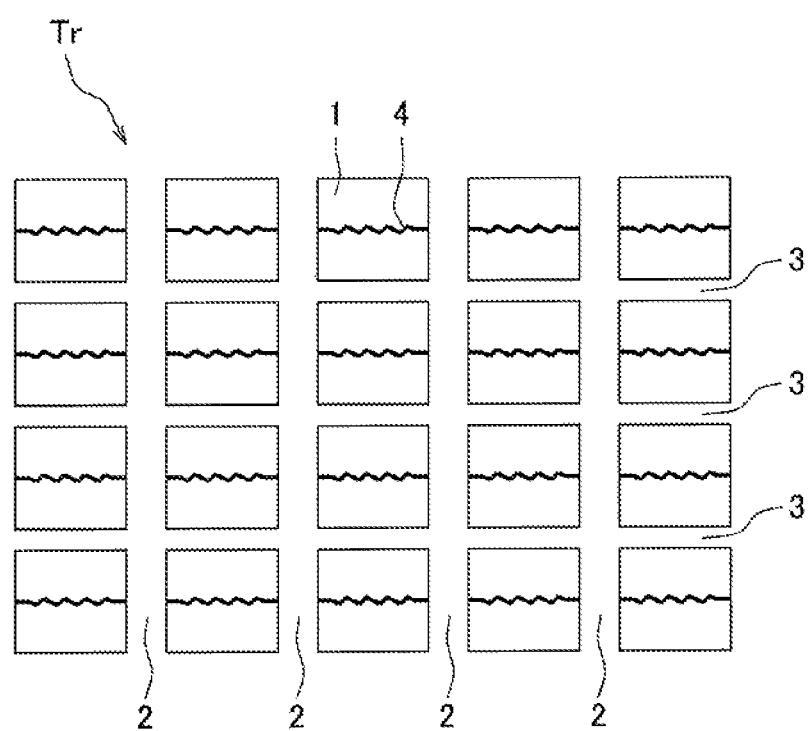
FIG. 1 is a plan view showing an example of a tread surface of a pneumatic tire according to the present invention.

Blocks 1 serving as land portions are provided in a tread surface Tr shown in FIG. 1. Each of the blocks 1 is sectioned by main grooves 2 and lateral grooves 3. The main groove 2 extends continuously in a tire circumferential direction, and the lateral groove 3 extends in a direction intersecting the main groove 2. The block 1 is formed into a rectangular shape in a plan view, however, is not limited to this. In place of or in addition to the blocks mentioned above, ribs extending continuously in the tire circumferential direction may be provided as the land portions.

Figure 2:
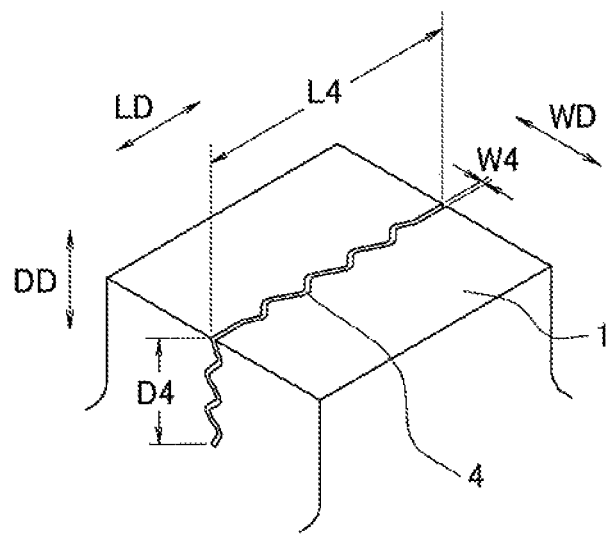
FIG. 2 is a perspective view of a block.

As shown in FIG. 2 in an enlarged manner, a sipe 4 is formed in the block 1. The sipe 4 extends in a tire width direction which is a lateral direction in FIG. 1. In order to improve an ice performance, particularly a start moving performance and a braking performance on an ice road surface, it is preferable that the sipe 4 extends in the direction intersecting the tire circumferential direction as mentioned above. At least one sipe may be formed in the block 1. Therefore, a plurality of sipes 4, for example, arranged at intervals in the tire circumferential direction may be provided in one block 1.

A length direction LD is a length direction of the sipe 4, and is the same direction as the tire width direction in the present embodiment. A sipe length L4 is measured as a linear distance between both ends of the sipe 4. A depth direction DD is a depth direction of the sipe 4. A sipe depth D4 is measured as a linear distance from a top surface to a sipe bottom. The sipe depth D4 is set, for example, to 40% to 80% of a depth of the main groove 2. A width direction WD is a width direction of the sipe 4, and is the same direction as the tire circumferential direction in the present embodiment. A sipe width W4 is set, for example, to 0.3 mm to 2.0 mm for achieving a sufficient edge effect.

Figure 3A:
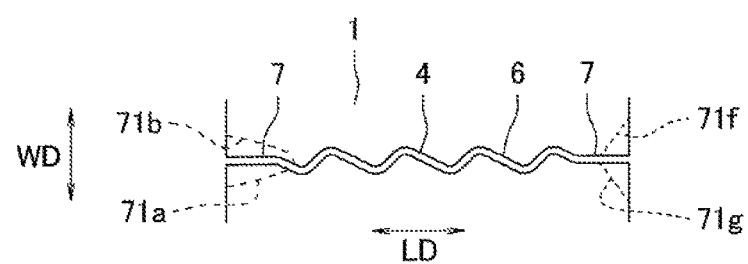
FIGS. 3(a), 3(b) and 3(c) are three-plane views of a sipe.
Figure 3B:
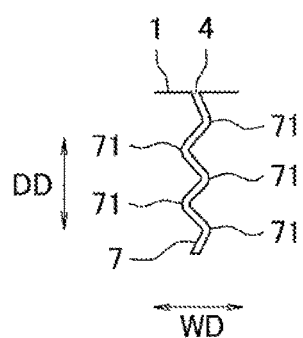
Figure 3C:
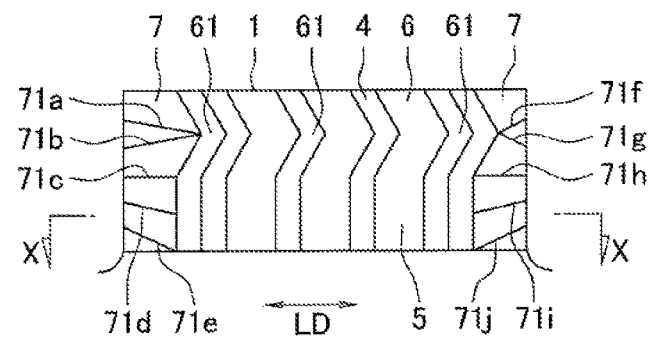
Figure 4:
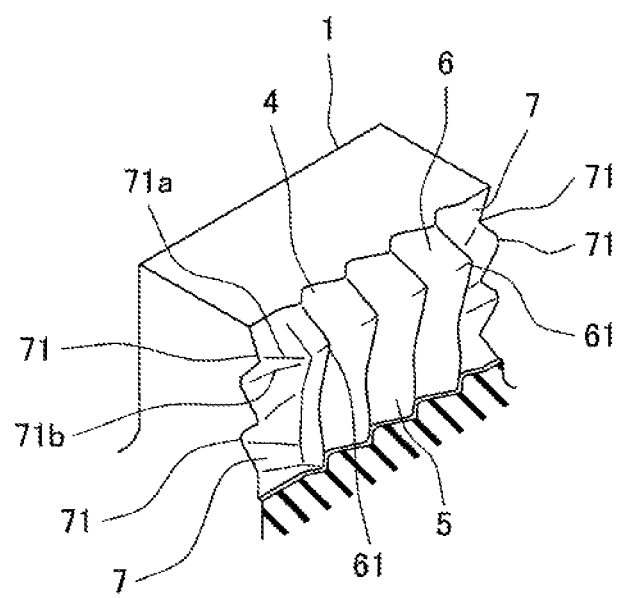
FIG. 4 is a perspective view showing a wall surface of the sipe.
Figure 5:
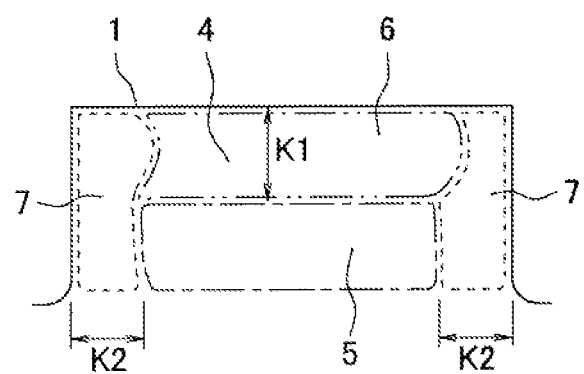
FIG. 5 is a view schematically showing areas of a 2D center portion, a 3D center portion and a 3D side portion.

FIGS. 3(a) to 3(c) are three-plane views including FIG. 3(a) which is a plan view of the sipe 4, FIG. 3(b) which is a side view thereof and FIG. 3(c) which is a front view thereof. FIG. 4 is a perspective view showing a wall surface of the sipe 4. As shown in FIGS. 3(a) to 3(c) and 4, the sipe 4 formed in the block 1 of the tread surface Tr has a 2D center portion 5 which is positioned in a sipe bottom side at the center in the length direction LD, a 3D center portion 6 which is positioned in a top surface side at the center in the length direction LD, and 3D side portions 7 which are positioned in both ends in the length direction LD. FIG. 5 schematically shows their areas.

The 2D center portion 5 is formed into a two-dimensional shape which is not changed along a depth direction DD. Each of the 3D center portion 6 and the 3D side portion 7 is formed into a three-dimensional shape which is changed along the depth direction DD. However, they are formed into the different three-dimensional shapes from each other. Further, each of the 3D center portion 6 and the 3D side portion 7 is open at a top surface. The opening of the 3D center portion 6 extends in the length direction LD while being bent in a width direction WD, and is formed into a wavy shape in which short sides and long sides are alternately repeated.

The sipe 4 is formed as a both-sides open sipe both ends of which are opened in a side surface of the block 1. However, the sipe 4 may be formed as a one-side open sipe only one end of which is opened, or a both-sides closed sipe both ends of which are closed within the block. The deformation of the block tends to become larger in both ends of the sipe, particularly in the periphery of the open sipe end, however, since the 3D side portion 7s are positioned in both ends of the sipe 4, excessive deformation of the block 1 can be suppressed as mentioned later. In the one-side open sipe, the 3D side portion is preferably positioned in the sipe end which is closed in the block, in the same manner as the open sipe end, however, the structure is not limited to this. The sipe length L4 is preferably equal to or more than 30% of the block width in the length direction LD, and more preferably equal to or more than 50%.

The two-dimensional shape of the 2D center portion 5 is formed into a wavy form, and the 2D center portion 5 is provided, on its wall surface, with concavo-convex lines extending in the depth direction DD. A transverse surface as seen from an arrow X-X is approximately the same as the shape in FIG. 3(a), and the wavy shape continues in the depth direction DD in the 2D center portion 5. The 2D center portion 5 is formed into a so-called wavy sipe, however, may be a plane sipe which is formed flat in its wall surface. In the plane sipe, the transverse surface is formed into a linear shape, and the linear shape continues in the depth direction. In a case that the sipe 4 has the 2D center portion 5, resistance at the mold releasing time in the curing step of the tire becomes smaller in comparison with a case that the sipe 4 has no 2D center portion 5.

The three-dimensional shape of the 3D center portion 6 has a structure in which the wall surfaces can engage with each other in the length direction LD. In the present embodiment, the three-dimensional shape extends in the depth direction DD while being bent with a center convex portion 61 having a convex shape in the length direction LD. The concavo-convex line extending in the depth direction DD with amplitude in the length direction LD are provided on the wall surfaces. The concavo-convex line is provided with a portion which is inclined to one direction of the length direction LD, and a portion which is inclined in an opposite direction thereto, and these portions are connected in the depth direction DD via the center convex portion 61. The concavo-convex line of the 3D center portion 6 is smoothly connected to the concavo-convex line of the 2D center portion 5.

The three-dimensional shape of the 3D side portions 7 has a structure in which the wall surfaces can engage with each other in the depth direction DD. In the present embodiment, the three-dimensional shape extends in the depth direction DD while being bent with side convex portions 71 having a convex shape in the width direction WD. Both ends of the sipe 4 where the 3D side portion 7 is positioned are formed into a wavy shape which extends in the depth direction DD with amplitude in the width direction WD as shown in FIG. 3(b). In the present embodiment, the wavy shape appears on the side surfaces of the block 1. On the wall surface, ridge lines 71a to 71j of the side convex portions 71 extend in the length direction LD, and each of the ridge lines 71a and 71b and the ridge lines 71f and 71g extends in the length direction LD starting at the center convex portion 61.

In the block 1, the deformation in the length direction LD is suppressed mainly by the 3D center portion 6, and the deformation in the width direction WD is suppressed mainly by the 3D side portion 7. The top surface side of the sipe 4 where the 3D center portion 6 is positioned, and both ends of the sipe 4 where the 3D side portion 7 is positioned are both positions where the deformation of the block 1 is comparatively great. Since these positions are formed into the three-dimensional shape, it is possible to effectively suppress the excessive deformation of the block 1 at the braking time and the cornering time. The 2D center portion 5 is positioned in the sipe bottom side at the center in the length direction LD, and this is a position where the deformation of the block 1 is comparatively small.

As mentioned already, the sipe 4 according to the present embodiment is formed as the both-sides open sipe both ends of which are opened in the side surfaces of the block 1, however, may be alternatively formed as the one-side open sipe one end of which is opened in the side surface of the block 1. The deformation of the block 1 tends to become particularly great in the periphery of the open sipe end mentioned above. Therefore, since the 3D side portion 7 is positioned in the open sipe end, it is possible to effectively suppress the excessive deformation of the block 1.

In a stage from an early stage to a middle stage of the wear, the deformation becomes large since the rigidity of the block 1 is comparatively low. However, according to the tire, the excessive deformation of the block 1 can be suppressed by the 3D center portion 6 and the 3D side portion 7 as mentioned above. Further, in a stage after the middle stage of the wear, the deformation becomes small since the rigidity of the block 1 is comparatively high. However, according to the tire, the rigidity of the block 1 does not become too high since the 3D center portion 6 is reduced or eliminated. As a result, the edge effect of the sipe 4 can be satisfactorily achieved. Further, since the 3D side portions 7 are positioned in both ends of the sipe 4 even after the middle stage of the wear, the rigidity of the block 1 is not lowered too much.

In the present embodiment, when the block 1 is going to be deformed in the back and forth direction at the starting time or the braking time, the wall surfaces formed into the three-dimensional shapes engage with each other, and the deformation thereof is suppressed mainly by the 3D side portion 7. Further, when the block 1 is going to be deformed in the lateral direction at the cornering time, the wall surfaces formed into the three-dimensional shapes engage with each other, and the deformation thereof is suppressed mainly by the 3D center portion 6. All the same time, it is possible to exhibit the excellent wear resistance and irregular wear resistance while securing the ice performance in correspondence to the rigidity change of the block 1 according to the wear. Further, the crack and the defect are not generated in the sipe 4 by skillfully combining the different three-dimensional shapes.

In addition, in the present embodiment, since the ridge lines 71a and 71b and the ridge lines 71f and 71g of the side convex portion 71 included in the three-dimensional shape of the 3D side portion 7 extend in the length direction LD starting at the center convex portion 61 which is included in the three-dimensional shape of the 3D center portion 6, the 3D center portion 6 and the 3D side portion 7 are smoothly connected, and it is possible to avoid a matter that the portion changes into an irregular shape. As a result, it is possible to prevent stress from being locally concentrated to the connection position between the 3D center portion 6 and the 3D side portion 7, when the wall surfaces of the sipe 4 engage with each other, and it is possible to prevent a crack and a defect from being generated within the sipe 4.

The amplitude in the width direction WD in the 3D side portion 7 is reduced toward the center in the length direction LD, and is converged substantially into a liner shape as seen from the length direction LD at a boundary between the 2D center portion 5 and the 3D side portion 7 and a boundary between the 3D center portion 6 and the 3D side portion 7. Therefore, each of the ridge lines of the side convex portion 71 is inclined so as to come close to the center in the width direction WD of the sipe 4 as it comes away from the sipe end. Accordingly, the connection in the boundary is smoothly achieved, and the irregular shape can be avoided. As a result, it is possible to prevent the stress from being locally concentrated into the boundary when the wall surfaces of the sipe 4 engage with each other, and it is possible to prevent the crack or the defect from being generated in the sipe 4.

In the present embodiment, the ridge lines 71*a* and 71*b* of two side convex portions 71 which are adjacent in the depth direction DD extend in the length direction starting at the same center convex portion 61. As shown in FIG. 3(*c*), the ridge lines 71*a* and 71*b* extend along the length direction LD while being inclined to the depth direction DD. The ridge lines 71*f* and 71*g* are structured in the same manner. As a result, it is possible to effectively suppress the deformation of the block 1 in both ends of the sipe 4 where the side convex portions 71 are densely arranged and the deformation of the block 1 tends to be larger than in the center. Since the sipe 4 is open to both the side surfaces of the block 1, the effect can be more significantly obtained.

In the present embodiment, as shown in FIG. 3(*c*), the three-dimensional shape of the 3D center portion 6 is formed into a sideways V-shaped form which is bent at one position in the depth direction DD. According to the 3D center portion 6 which is formed into the three-dimensional shape as mentioned above, it is possible to satisfactorily suppress the excessive deformation of the block 1 in the length direction LD. A shape which is bent at a plurality of positions in the depth direction DD may be employed, however, in comparison with the shape of the kind, the present embodiment can reduce the resistance at the mold releasing time in the tire curing step.

A distance K1 (refer to FIG. 5) from the top surface to the boundary between the 2D center portion 5 and the 3D center portion 6 is preferably between 20% and 70% of the sipe depth D4. As a result, the sizes in the depth direction DD of the 2D center portion 5 and the 3D center portion 6 can be appropriately secured. The distance K1 is more preferably equal to or more than 30% of the sipe depth D4, and further preferably equal to or more than 40%. Further, the distance K1 is more preferably equal to or less than 60% of the sipe depth D4.

A distance K2 (refer to FIG. 5) from the sipe end to the boundary between the 2D center portion 5 and the 3D side portion 7 is preferably between 10% and 40% of the sipe length L4. As a result, the sizes in the length direction LD of the 2D center portion 5 and the 3D side portion 7 can be appropriately secured, and the size in the length direction LD of the 3D center portion 6 can be further approximately secured. The distance K2 is more preferably equal to or more than 15% of the sipe length L4. Further, the distance K2 is more preferably equal to or less than 30% of the sipe length L4, and further preferably equal to or less than 20%.

Figure 6A:
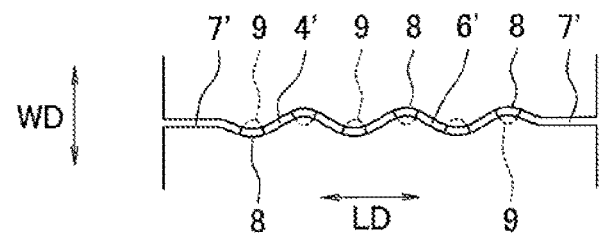
FIGS. 6(a), 6(b) and 6(c) are three-plane views of a sipe according to the other embodiment.
Figure 6B:
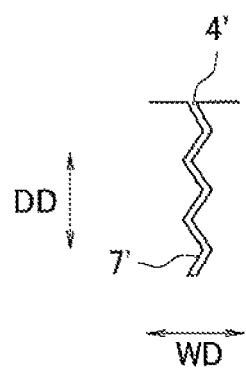
Figure 6C:
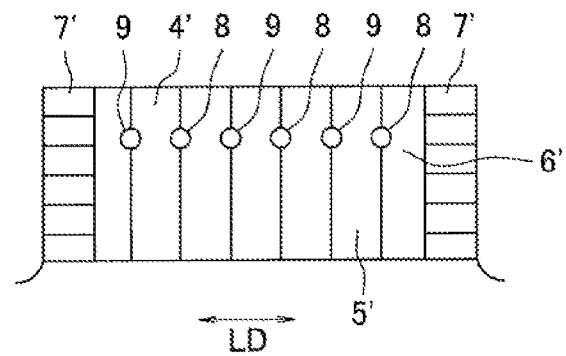

FIGS. 6(*a*), 6(*b*) and 6(*c*) are three-plane views including a plan view in FIG. 6(*a*), a side view in FIG. 6(*b*) and a front view in FIG. 6(*c*) of a sipe 4' according to the other embodiment. The sipe 4' has a 2D center portion 5', a 3D center portion 6' and a 3D side portion 7'. The 2D center portion 5' has the same structure as the 2D center portion 5 shown in FIG. 3. The 3D side portion 7' has the same structure as the 3D side portion 7 shown in FIG. 3 except for an angle of inclination of the ridge line of the side convex portion.

The three-dimensional shape of the 3D center portion 6' is obtained by providing projections 8 and recesses 9 engaging with each other on wall surfaces formed by a wavy surface. The wavy surface is constructed by a concavo-convex line extending in the depth direction DD. In the present embodiment, the projections 8 are provided in valley-like top portions in the concavo-convex line, and the recesses 9 are provided in mountain-like top portions opposing thereto. By the 3D center portion 6' formed into the three-dimensional shape as mentioned above, it is possible to satisfactorily suppress the excessive deformation of the block 1 in the length direction LD. A structure in which the projections and the recesses as mentioned above are provided on wall surfaces formed by a flat surface is conceivable as a modified example of the three-dimensional shape.

The pneumatic tire according to the present invention can be constructed in the same manner as the normal pneumatic tire except the matter that the sipe as mentioned above is formed in the land portion such as the block or the rib. Therefore, it is possible to employ any conventionally known materials and manufacturing methods.

The pneumatic tire according to the present invention is useful particularly as the studless tire since an excellent ice performance can be achieved by obtaining the operations and effects as mentioned above.

The present invention is not limited to the embodiment mentioned above, but can be improved and modified variously within the scope of the present invention.

EXAMPLES

A description will be given below of an example which specifically shows the structure and the effect of the present invention. Evaluation of each of performances of the tire was executed as follows.

(1) Wear Resistance

A tire assembled to a rim of 22.5×7.50 and having a size 11R22.5 was installed to a vehicle having a fixed load capacity 10t and was filled with internal pressure 700 kPa. An amount of wear of the tire after traveling for 20000 km was measured and a reciprocal number thereof was indexed. The greater the index number is, the less the amount of wear is and the more excellent the wear resistance is.

(2) Irregular Wear Resistance

An amount of irregular wear (a heel-and-toe wear amount, a center wear amount and a shoulder wear amount) of the tire after traveling for 20000 km was measured, and a reciprocal number thereof was indexed. The greater the index number is, the less the amount of irregular wear is and the more excellent the irregular wear resistance is.

(3) Ice Performance

A tire assembled to a rim of 22.5×7.50 and having a size 11R22.5 was installed to a vehicle having a fixed load capacity 10t and was filled with internal pressure 700 kPa. Results of evaluation of a start moving performance and a braking performance on an ice road surface were integrated and indexed. The start moving performance was scored by measuring time required for the vehicle to advance a distance of 30 m from a stop state. The braking performance was scored by measuring a braking distance until the vehicle stops from a traveling state at a speed of 30 km/h. The greater the index number is, the higher the point is and the more excellent the ice performance is.

(4) Mold Releasing Performance

The curing step was carried out for fifty tires, the number of the tires in which the close attachment to a mold was generated at the mold releasing time due to the blade for forming the sipe was counted, and a reciprocal number thereof was indexed. The greater the index number is, the less the close attachment to the mold is, and the more excellent the mold releasing performance is.

The tires according to the working example and the comparative example provided for the performance evaluation mentioned above have the common structures except for the shape of the sipe. In the working example and the comparative example, the sipes shown in FIGS. 3(a) to 3(c) and 7 are respectively formed in all the blocks in the tread surfaces. The sipe 40 in FIG. 7 has only the three-dimensional shape which corresponds to the 3D center portion shown in FIG. 3(c), and is provided in its wall surface with concavo-convex lines which are bent at two positions in the depth direction of the sipe. Results of the evaluation are shown in Table 1.

TABLE 1

Figure 7:
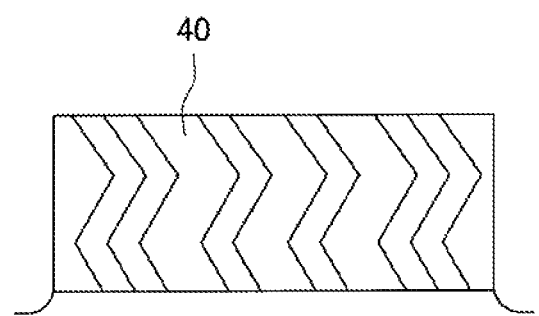
FIG. 7 is a front view of a sipe in a tire according to a comparative example.

|  | Comparative example | Working example |
|---|---|---|
| Sipe shape | FIG. 7 | FIG. 3 |
| Wear resistance | 100 | 101 |
| Irregular wear resistance | 100 | 108 |
| Ice performance | 100 | 100 |
| Mold releasing performance | 100 | 116 |

As shown in Table 1, it is possible to exhibit the excellent wear resistance and irregular wear resistance while securing the ice performance in the working example, and an improvement effect can be confirmed. Further, in the working example, the mold releasing performance is improved since the sipe has the 2D center portion.

What is claimed is:

1. A pneumatic tire comprising:
   a sipe formed in a land portion of a tread surface,
   the sipe comprising:
   a 2D center portion which is positioned in a sipe bottom side at a center in a length direction and is formed into a two-dimensional shape which is not changed along a depth direction;
   a 3D center portion which is positioned in a top surface side at the center in the length direction and is formed into a three-dimensional shape which is changed along the depth direction; and
   a 3D side portion which is positioned in one end or both ends in the length direction and are formed into a three-dimensional shape which is changed along the depth direction and wherein the three-dimensional shape of the 3D side portion spans from a top side of the sipe to a bottom side of the sipe and overlaps alongside both the 2D center portion and the 3D center portion,
   wherein each of the 3D center portion and the 3D side portion is open at the top surface,
   the three-dimensional shape of the 3D center portion has a structure in which wall surfaces are engageable with each other in the length direction, and the three-dimensional shape of the 3D side portion has a structure in which wall surfaces are engageable with each other in the depth direction, and
   wherein the three-dimensional shape of the 3D center portion extends in the depth direction while being bent with a center convex portion which is formed into a convex shape in the length direction.

2. The pneumatic tire according to claim 1, wherein one end or both ends of the sipe are open in a side surface of the land portion, and the 3D side portion is positioned in the open sipe end.

3. The pneumatic tire according to claim 1, wherein the three-dimensional shape of the 3D side portion extends in the depth direction while being bent with a side convex portion which is formed into a convex shape in a width direction.

4. The pneumatic tire according to claim 1, wherein a distance from the top surface to a boundary between the 2D center portion and the 3D center portion is between 20% and 70% of a sipe depth.

5. The pneumatic tire according to claim 1, wherein a distance from a sipe end to a boundary between the 2D center portion and the 3D side portion is between 10% and 40% of a sipe length.

6. The pneumatic tire according to claim 1, wherein the three-dimensional shape of the 3D side portion extends substantially the entire depth of the sipe.

7. The pneumatic tire according to claim 1, wherein an amplitude in a width direction of the 3D side portion is reduced toward a center in a length direction of the sipe and is converged substantially into a linear shape as seen from the length direction at a boundary between the 2D center portion and the 3D side portion and at a boundary between the 3D center portion and the 3D side portion.

8. The pneumatic tire according to claim 1, wherein said center convex portion of the three-dimensional shape of the 3D center portion is the only center convex portion of the three-dimensional shape of the 3D center portion.

9. A pneumatic tire comprising:
   a sipe formed in a land portion of a tread surface,
   the sipe comprising:
   a 2D center portion which is positioned in a sipe bottom side at a center in a length direction and is formed into a two-dimensional shape which is not changed along a depth direction;
   a 3D center portion which is positioned in a top surface side at the center in the length direction and is formed into a three-dimensional shape which is changed along the depth direction; and
   a 3D side portion which is positioned in one end or both ends in the length direction and are formed into a three-dimensional shape which is changed along the depth direction and wherein the three-dimensional shape of the 3D side portion spans from a top side of the sipe to a bottom side of the sipe and overlaps alongside both the 2D center portion and the 3D center portion,
   wherein each of the 3D center portion and the 3D side portion is open at the top surface,
   the three-dimensional shape of the 3D center portion has a structure in which wall surfaces are engageable with each other in the length direction, and the three-dimensional shape of the 3D side portion has a structure in which wall surfaces are engageable with each other in the depth direction,
   the three-dimensional shape of the 3D center portion extends in the depth direction while being bent with a center convex portion which is formed into a convex shape in the length direction, and the three-dimensional shape of the 3D side portion extends in the depth direction while being bent with a side convex portion which is formed into a convex shape in a width direction, and ridge line of the side convex portion extend in the length direction starting at the center convex portion.

10. The pneumatic tire according to claim 9, wherein the ridge lines of two side convex portions which are adjacent in the depth direction extend in the length direction starting at the same center convex portion.

11. The pneumatic tire according to claim 9, wherein the three-dimensional shape of the 3D center portion is formed into a sideways V-shaped form which is bent at one position in the depth direction.

* * * * *